(12) United States Patent
Teragawa et al.

(10) Patent No.: US 10,712,612 B2
(45) Date of Patent: Jul. 14, 2020

(54) DISPLAY DEVICE

(71) Applicant: SAKAI DISPLAY PRODUCTS CORPORATION, Sakai-shi, Osaka (JP)

(72) Inventors: Daisuke Teragawa, Sakai (JP); Noriaki Miyoshi, Sakai (JP); Tomohiro Asamizu, Sakai (JP)

(73) Assignee: SAKAI DISPLAY PRODUCTS CORPORATION, Sakai-shi, Osaka (JP)

(*) Notice: Subject to any disclaimer, the term of this patent is extended or adjusted under 35 U.S.C. 154(b) by 155 days.

(21) Appl. No.: 16/078,857

(22) PCT Filed: Feb. 22, 2016

(86) PCT No.: PCT/JP2016/055103
§ 371 (c)(1),
(2) Date: Aug. 22, 2018

(87) PCT Pub. No.: WO2017/145240
PCT Pub. Date: Aug. 31, 2017

(65) Prior Publication Data
US 2020/0133076 A1 Apr. 30, 2020

(51) Int. Cl.
*G02F 1/133* (2006.01)
*G02F 1/13357* (2006.01)

(52) U.S. Cl.
CPC .. *G02F 1/133611* (2013.01); *G02F 1/133605* (2013.01); *G02F 1/133606* (2013.01); *G02F 1/133608* (2013.01); *G02F 1/133603* (2013.01)

(58) Field of Classification Search
CPC ......... G02F 1/133611; G02F 1/133605; G02F 1/133606; G02F 1/133608; G02F 1/133603
See application file for complete search history.

(56) References Cited

U.S. PATENT DOCUMENTS

| 2019/0004373 A1* | 1/2019 | Asamizu | G02F 1/1333 |
| 2019/0146278 A1* | 5/2019 | Son | G02F 1/133606 349/64 |

FOREIGN PATENT DOCUMENTS

JP 2002-169479 A 6/2002

* cited by examiner

*Primary Examiner* — Anne M Hines
(74) *Attorney, Agent, or Firm* — ScienBiziP, P.C.

(57) ABSTRACT

To provide a display device whereby luminance distribution uniformity within a display surface can be improved. A display device of the present invention is provided with: a rectangular display panel, one surface of which displays an image; a substrate, which is disposed to face the other surface of the display panel, said other surface being on the reverse side of the one surface, and on which a plurality of light sources are mounted; a diffuser plate disposed between the display panel and the substrate; and a supporting member, which has an opening, which light emitted from the light sources passes through, and which supports the peripheral end of the diffuser plate. The display device is also provided with reflecting members, which are respectively provided at the peripheries of the light sources close to four corner portions of the display panel, and which reflect light diffused by the diffuser plate to the corner portions of the display panel.

9 Claims, 12 Drawing Sheets

DISPLAY DEVICE

TECHNICAL FIELD

The present invention relates to a display apparatus with a direct backlight module.

BACKGROUND ART

Recently, display apparatuses each including a liquid crystal panel as an image display section are widely used. The display apparatuses each include a backlight module on the back side of the liquid crystal panel.

Various designs are employed for arrangement of the backlight module. One example of employed backlight module arrangement is a direct arrangement of the backlight module in which a light source is located opposite to the entirety of a back surface of the liquid crystal panel. For example, Patent Literature 1 discloses a backlight device in which a hollow cylindrical light source and a reflection body are disposed in a flat casing with an opening at an upper end thereof and a light transmission-diffusion body is disposed at the opening of the casing.

A display apparatus including a backlight device such as above displays an image on a front surface of the liquid crystal panel in a manner that light from the light source is diffused by the light transmission-diffusion body and the diffused light is allowed to pass through the liquid crystal panel while being modulated by the liquid crystal panel.

CITATION LIST

Patent Literature

[Patent Literature 1]
Japanese Patent Application Laid-Open Publication No. 2002-169479

SUMMARY OF INVENTION

Technical Problem

In Patent Literature 1 described above, reflection bodies having different reflection properties are respectively disposed on a bottom inner surface and a side inner surface of the casing to even out light quantities at a part of a light irradiated surface having low luminance and at a part thereof having high luminance, thereby reducing unevenness in luminance.

However, in the backlight device disclosed in Patent Literature 1, light reflected by the side surface of the casing is lead to an inner region of the light irradiated surface with a result that sufficient luminance cannot be obtained at four corners of the light irradiated surface.

The present invention has been made in view of the foregoing and has its object of providing a display apparatus in which degree of evenness of luminance distribution over a display surface is increased.

Solution to Problem

A display apparatus of the present application includes a rectangular display panel, a substrate, a diffusion plate, a support member, and reflection members. The display panel has one surface on which an image is displayed. The substrate faces another surface of the display panel which is opposite to the one surface. A plurality of light sources are mounted on the substrate. The diffusion plate is disposed between the display panel and the substrate. The support member has an opening through which light from the plurality of light sources passes, and supports a peripheral portion of the diffusion plate. The reflection members are respectively provided around light sources among the plurality of light sources located near tour corners of the display panel, and each reflect light diffused by the diffusion plate toward a corresponding one of the four corners of the display panel.

Advantageous Effects of Invention

According to the present application, degree of evenness of luminance distribution over the display surface can be increased.

DESCRIPTION OF EMBODIMENTS

The present invention will be described below with reference to drawings that illustrate embodiments thereof.

First Embodiment

Figure 1:
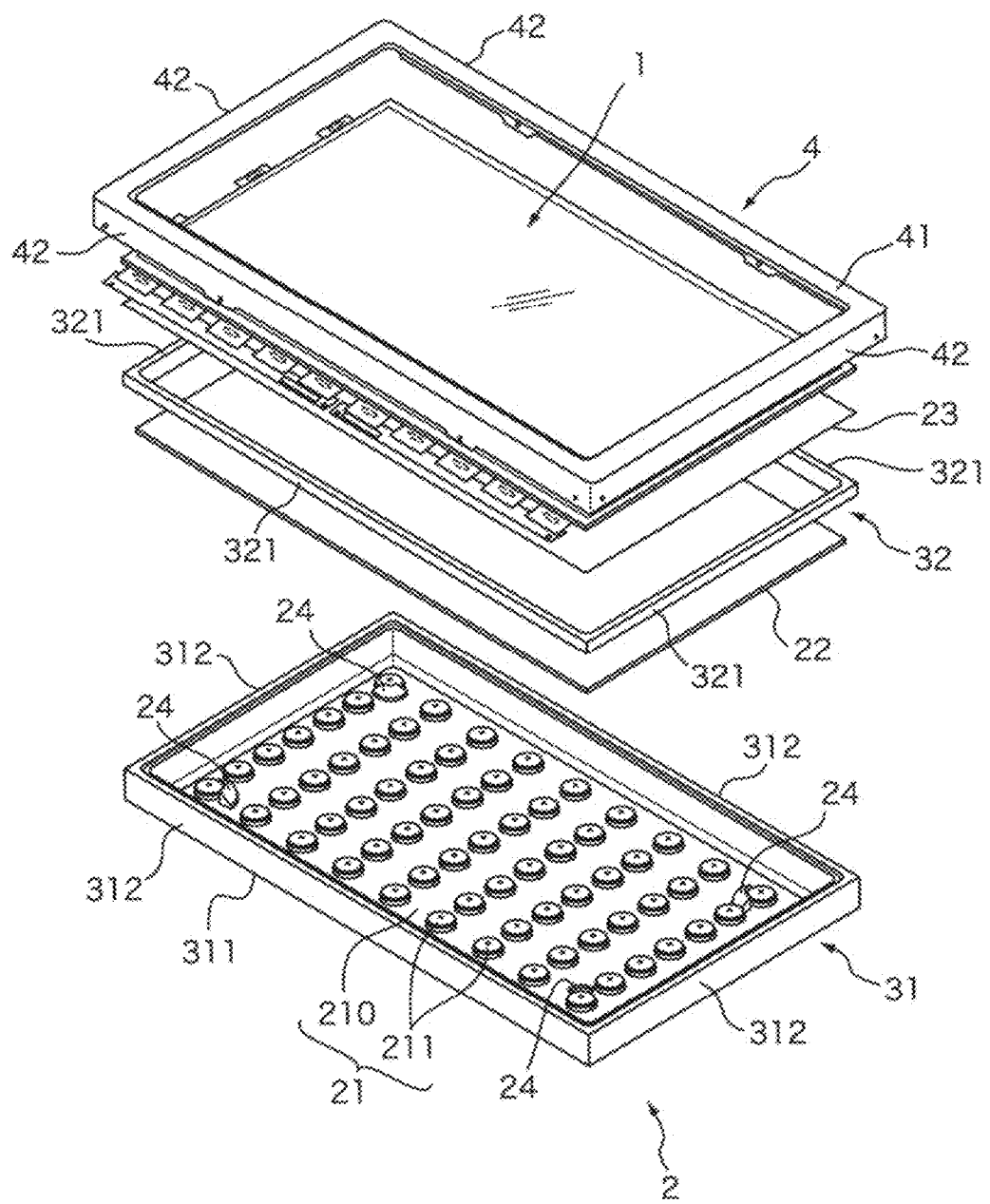
FIG. 1 is an exploded perspective view of a display apparatus according to a first embodiment.
Figure 2:
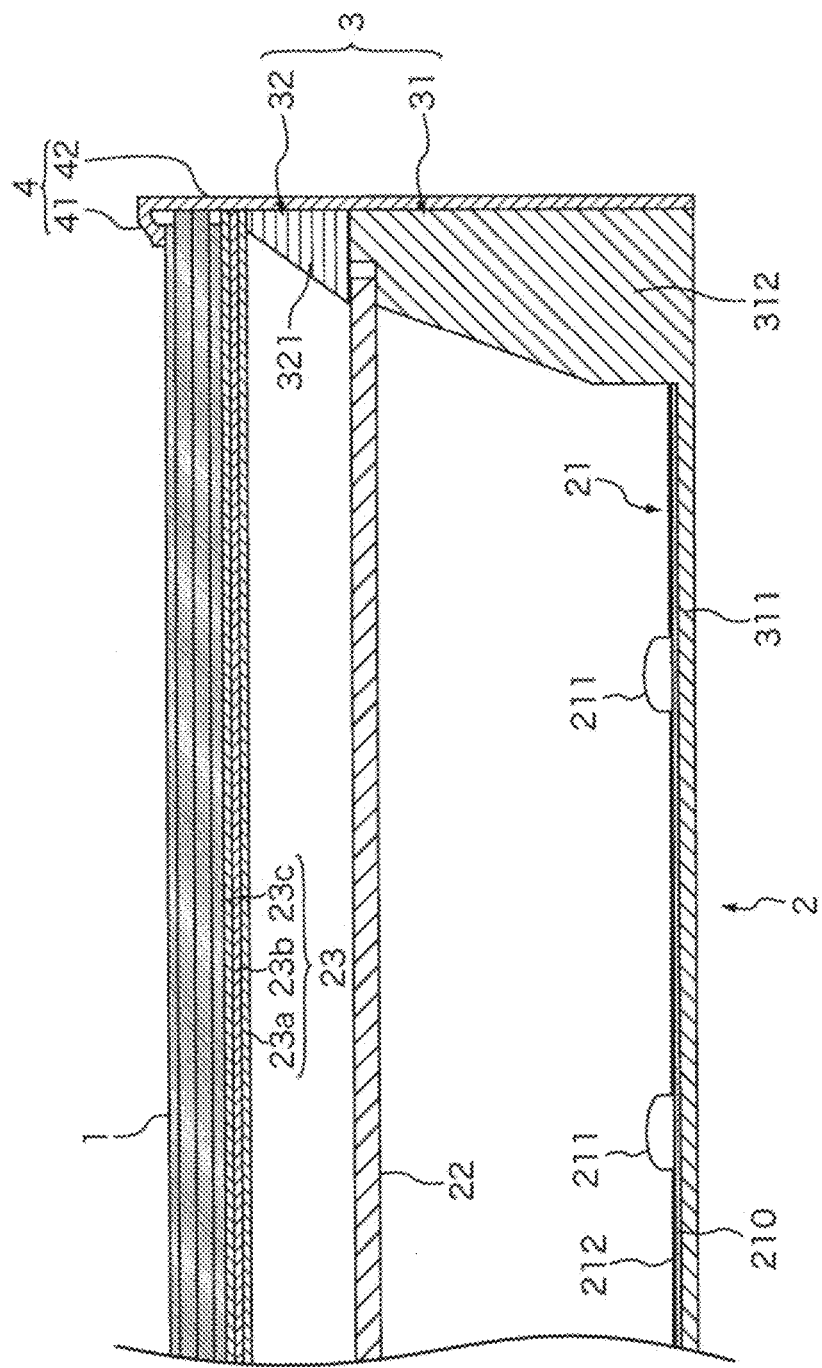
FIG. 2 is a vertical cross-sectional view of the display apparatus according to the first embodiment.

FIG. 1 is an exploded perspective view of a display apparatus according to a first embodiment. FIG. 2 is a vertical cross-sectional view of the display apparatus according to the first embodiment. The display apparatus according to the present embodiment is a liquid crystal display apparatus for example including a liquid crystal panel 1 on a front side thereof and a light source section 2 on a back side thereof.

The liquid crystal panel 1 is a rectangular display panel including a plurality of liquid crystal display elements arranged in a matrix for displaying an image on a front surface of the liquid crystal panel 1.

The light source section 2 is a direct backlight module that emits light from the back of the liquid crystal panel 1. The light source section 2 includes a light emitting diode (LED) substrate 21, a diffusion plate 22, and an optical sheet 23, and irradiates the liquid crystal panel 1 with light emitted from light sources (LED chips 211) on the LED substrate 21 through the diffusion plate 22 and the optical sheet 23.

The LED substrate 21 includes a rectangular substrate 210 and the plurality of LED chips 211, 211, . . . , 211 mounted on the substrate 210 at substantially regular intervals in a longitudinal direction and a short direction of the substrate 210. The LED chips 211 each are for example a package including a light emitting diode element, a fluorescent body covering the light emitting diode element, and an accommodation body that accommodates them. Also, reflection members 24, 24, 24, and 24 are respectively provided around LED chips 211, 211, 211, and 211 located near four corners of the liquid crystal panel 1. Further, the LED substrate 21 has a surface on which a reflection sheet 212 having high reflectivity is disposed.

The diffusion plate 22 is a rectangular plate body having a specific thickness and made of a synthetic resin having high transparency, such as an acrylic resin or a polycarbonate resin. The diffusion plate 22 includes a number of diffusion particles dispersed therein, and has a function of diffusing light passing through the diffusion plate 22. That is, light of the LED chips 211 entering the diffusion plate 22 from one of surfaces of the diffusion plate 22 is diffused by the diffusion particles therein when traveling in a thickness direction of the diffusion plate 22. Part of the diffused light passes toward another surface of the diffusion plate 22 (front side of the display apparatus), while another part thereof is reflected toward the one surface of the diffusion plate 22 (back side of the display apparatus).

The optical sheet 23 is a transparent sheet having a specific optical property, and is formed of a lamination body of a plurality of sheets. The optical sheet 23 in the present embodiment is formed of a lamination body of a diffusion sheet 23a, a lens sheet 23b, and a reflective polarizing sheet 23c. Note that the number of sheets and the configuration of the sheets constituting the optical sheet 23 can be altered as appropriate according to required specification such as luminance or optical property.

The display apparatus includes a panel chassis 3 that accommodates the LED substrate 21. The panel chassis 3 in the present embodiment includes a backside panel chassis 31 that is a shallow bottomed casing and a frontside panel chassis 32 that is a frame-shaped frame body with an opening at a central part thereof.

The backside panel chassis 31 includes a rectangular bottom surface portion 311 and side walls 312. The LED substrate 21 on which the LED chips 211 are mounted is attached to the bottom surface portion 311. The side walls 312 stand upright from the peripheral edge of the bottom surface portion 311. The backside panel chassis 31 is made of for example a metal excellent in thermal conductivity, such as aluminum, for releasing heat emitted from the LED chips 211. The side walls 312 each have an inner surface that is an inclined surface inclined obliquely outward between the bottom surface portion 311 and the diffusion plate 22 (i.e., an inclined surface of each side wall 312 of which thickness gradually decreases in a tapered manner in a height direction thereof) and that reflects incident light toward the front side of the display apparatus. In this connection, the inclined surfaces of the side walls 312 are each preferably formed of a reflection body for example having a light reflectivity of at least 85%. Alternatively, a reflection sheet having high reflectivity may be provided on or near the inclined surfaces or white paint may be applied onto reflection surfaces.

The frontside panel chassis 32 is a frame-shaped frame body with an opening at a central part thereof. The frontside panel chassis 32 includes four peripheral walls 321. The frontside panel chassis 32 and the backside panel chassis 31 hold a peripheral portion of the diffusion plate 22 therebetween to support the diffusion plate 22. The peripheral walls 321 each have an inner surface that is an inclined surface inclined obliquely outward between the diffusion plate 22 and the optical sheet 23 (i.e., an inclined surface of each peripheral wall 321 of which thickness gradually decreases in a tapered manner in a height direction thereof) and that reflects incident light toward the front side of the display apparatus. In this connection, the inclined surfaces of the peripheral walls 321 are each preferably formed of a reflection body for example having a light reflectivity of at least 85%. Alternatively, a reflection sheet having high reflectivity may be provided on or near the inclined surfaces or white paint may be applied onto reflection surfaces.

The display apparatus further includes a frame-shaped bezel 4 that covers a peripheral portion of the liquid crystal panel 1 from the front side of the display apparatus. The bezel 4 is a frame body slightly larger than the panel chassis 3, and has an opening at a central part thereof. The bezel 4 includes a frame portion 41 that covers the peripheral portion of the liquid crystal panel 1 from the front of the liquid crystal panel 1 and side walls 42 that cover side outer surfaces of the panel chassis 3. When the bezel 4 is set in a state in which the diffusion plate 22 is held between the backside panel chassis 31 and the frontside panel chassis 32 and the optical sheet 23 and the liquid crystal panel 1 are placed on the frontside panel chassis 32, the frame portion 41 is in contact at an inner surface thereof with the peripheral portion of the liquid crystal panel 1 on the front side thereof while the side walls 42 are in contact at inner surfaces thereof with side outer surfaces of the backside panel chassis 31 and the frontside panel chassis 32. Thus, the liquid crystal panel 1 is supported together with the optical sheet 23 in a manner to be held between the frontside panel chassis 32 and the frame portion 41 of the bezel 4.

The display apparatus according to the present embodiment is configured as above. The display apparatus performs image display in a manner that the liquid crystal panel 1 is irradiated with light from the back using the light source section 2 and light transmittance of each of the liquid crystal display elements (pixels) arranged in the liquid crystal panel 1 is adjusted by driving and controlling the liquid crystal display elements by a non-illustrated drive circuit.

Figure 3:
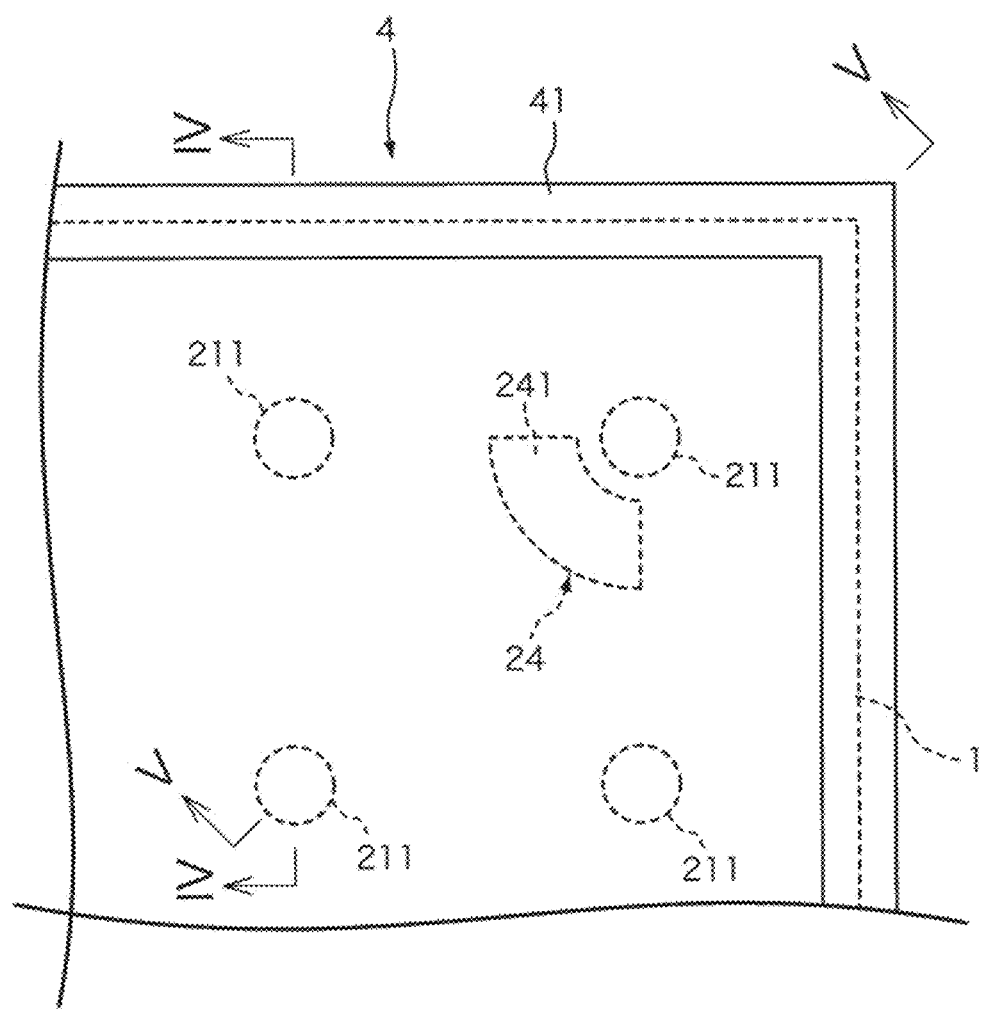
FIG. 3 is a partial front view of the display apparatus according to the first embodiment.
Figure 4:
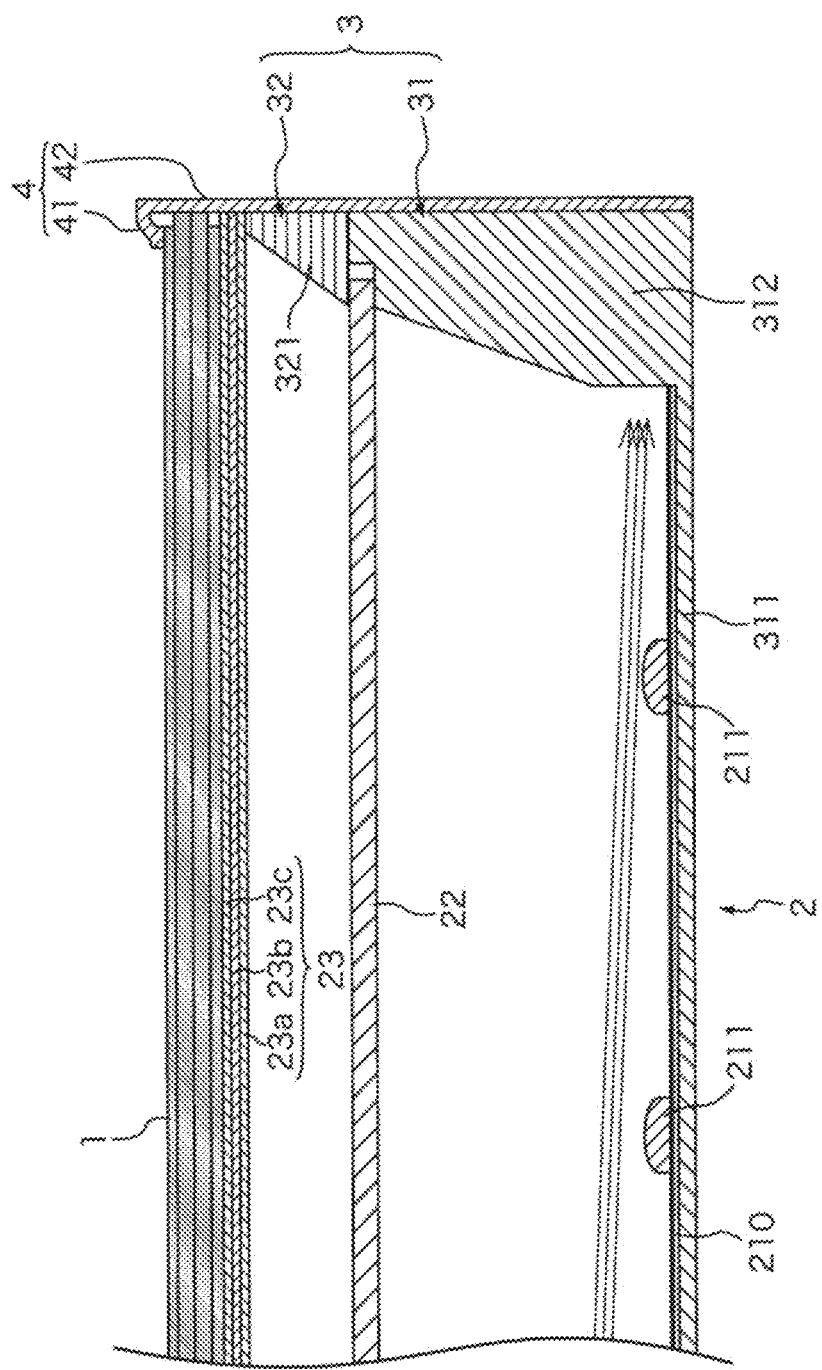
FIG. 4 is a cross-sectional view taken along a line IV-IV in FIG. 3.
Figure 5:
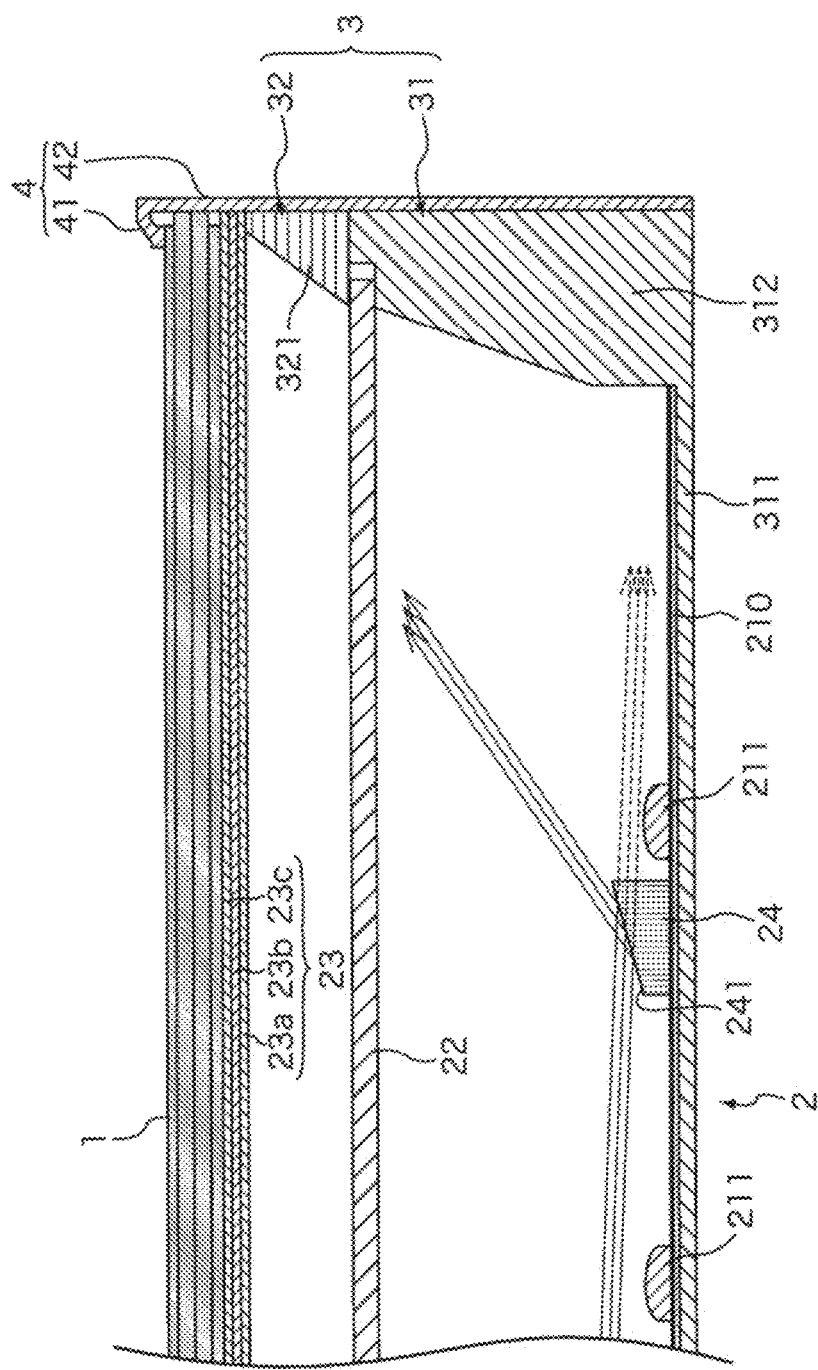
FIG. 5 is a cross-sectional view taken along a line V-V in FIG. 3.

FIG. 3 is a partial front view of the display apparatus according to the first embodiment, FIG. 4 is a cross-sectional view taken along a line IV-IV in FIG. 3. FIG. 5 is a cross-sectional view taken along a line V-V in FIG. 3. As described above, the reflection members 24 are provided around the LED chips 211 located near the four corners of the liquid crystal panel 1. In the present embodiment, the LED chips 211, 211, . . . , 211 are mounted on the substrate 210 at substantially regular intervals in the longitudinal direction and the short direction of the substrate 210. The reflection members 24 are respectively provided around four LED chips 211, 211, 211, and 211 located at four corners among the thus arranged LED chips 211, 211, . . . , 211.

The reflection members 24 in the present embodiment each have a reflection surface 241 within a range from 90° to 270° (for example, a range from 135° to 25°) relative to a straight line connecting the center of a light source of a corresponding one of the LED chips 211 and a corresponding one of four corners of the substrate 210. The reflection surface 241 is inclined such that height of the reflection surface 241 from the LED substrate 210 increases toward the corresponding corner of the substrate 210 as illustrated in FIG. 5.

The reflection surface 241 of each reflection member 24 reflects light emitted from the LED chips 211, 211, ..., 211 and diffused by the diffusion plate 22 or the optical sheet 23 toward a corresponding one of the four corners of the liquid crystal panel 1 that is closest to the reflection member 24. In this connection, the entirety of the reflection member 24 (or the reflection surface 241 of the reflection member 24) is preferably formed of a reflection body for example having a light reflectivity of at least 85%. Alternatively, a reflection sheet having high reflectivity may be provided on or near the reflection surface 241 or white paint may be applied onto the reflection surface 241.

When light from the LED chips 211, 211, ..., 211 passes through the diffusion plate 22, the diffusion plate 22 diffuses the light using the diffusion particles therein. Therefore, the diffusion plate 22 has a function of evening out luminance distribution of light passing toward the liquid crystal panel 1 over the surface thereof. Generally, however, distance from light sources such as LEDs to a panel chassis is longer in an oblique direction than in a vertical direction or a horizontal direction. As a result, a light quantity tends to decrease in four corner regions of a panel and therefore the four corner regions tend to be noticeably dark relatively when compared to a region of the panel other than the four corner regions.

In view of the foregoing, the reflection members 24 are provided around the LED chips 211 located near the four corners of the liquid crystal panel 1 in the present embodiment. In the above configuration, not only light emitted from the LED chips 211 toward the four corners of the liquid crystal panel 1 but also light that is diffused by the diffusion plate 22 or the optical sheet 23 and that would otherwise reach four corners formed by side inner surfaces of the backside panel chassis 31 reaches the four corners of the liquid crystal panel 1.

Therefore, a light quantity of light reaching the four corners of the liquid crystal panel 1 can be increased in the first embodiment relatively when compared to a configuration without the reflection members 24. Thus, reduction in light quantity in the vicinities of the four corners of the liquid crystal panel 1 can be prevented and degree of evenness of luminance distribution over the surface of the liquid crystal panel 1 can be increased.

In particular, even in a display apparatus having a narrow frame that cannot sufficiently cover the periphery of a panel, evenness of luminance distribution over an effective display surface can be ensured. Moreover, even in a multi-display apparatus in which a plurality of the display apparatuses according to the present embodiment are arranged side by side, dark portions at respective four corner regions of adjacent display, apparatuses can be made inconspicuous.

Note that according to luminance required at the four corners of the liquid crystal panel 1, appropriate alterations can be made on for example: width of the reflection members 24; angle range within which the reflection surfaces 241 are provided; height of the reflection members 24 from the surface of the substrate 210; inclination angle of the reflection surfaces 241; and distance between the reflection members 24 and the corresponding LED chips 211.

Further, although the present embodiment has been described about a configuration in which the reflection members 24 are provided around the LED chips 211, 211, 211, and 211 located at the four corners, location of the reflection members 24 can be altered as appropriate according to arrangement of the LED chips 211. For example, in a configuration in which at least two LED chips 211 are located closest to one corner of the liquid crystal panel 1, the reflection members 24 may be respectively provided around the at least two LED chips 211.

Second Embodiment

Although the reflection members 24 described in the first embodiment each have the reflection surface 241 within a range from 90° to 270° (for example, a range from 135° to 225°) relative to a straight line connecting the center of a light source of a corresponding one of the LED chips 211 and a corresponding one of the four corners of the substrate 210, the shape of the reflection members is not limited to that of the reflection members 24 described in the first embodiment.

Figure 6:
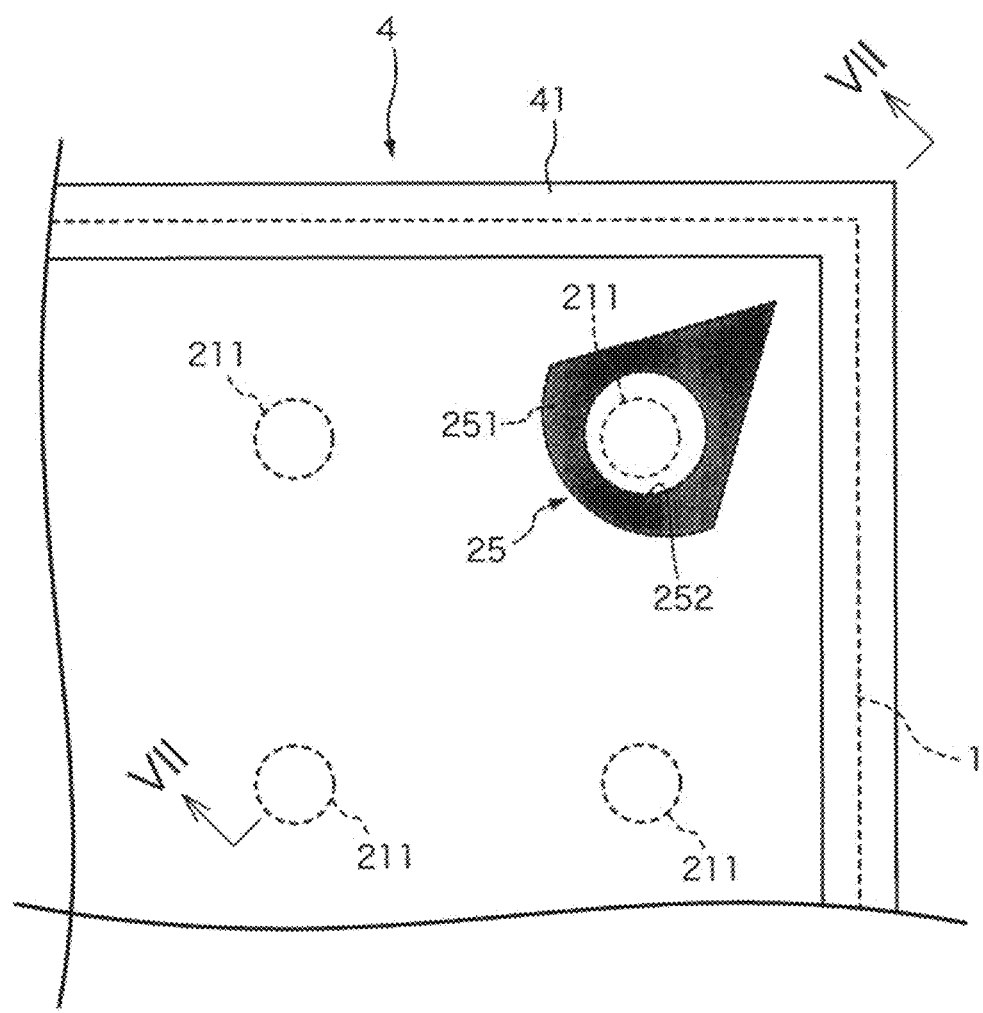
FIG. 6 is a partial front view of a display apparatus according to a second embodiment.
Figure 7:
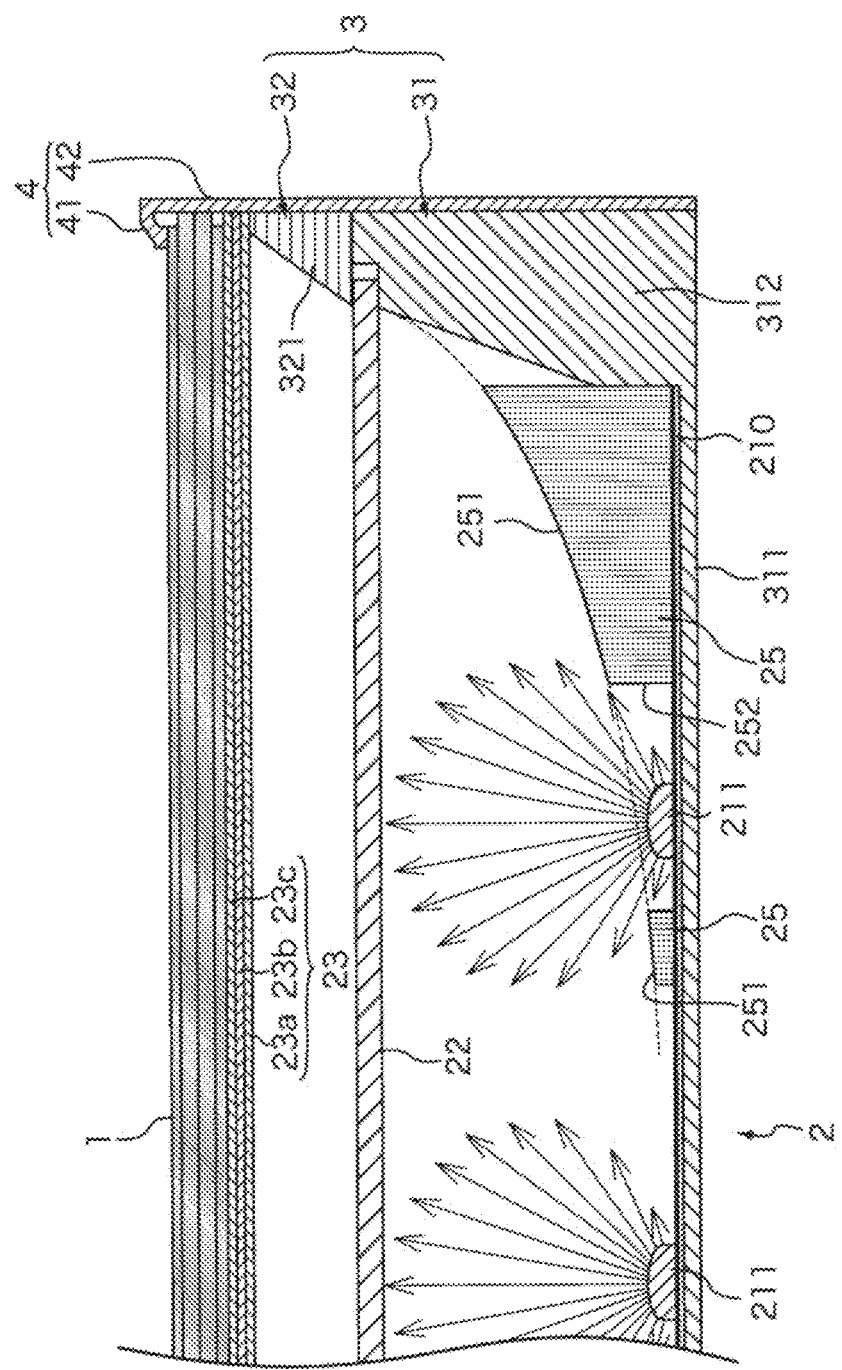
FIG. 7 is a cross-sectional view taken along a line VII-VII in FIG. 6.
Figure 8:
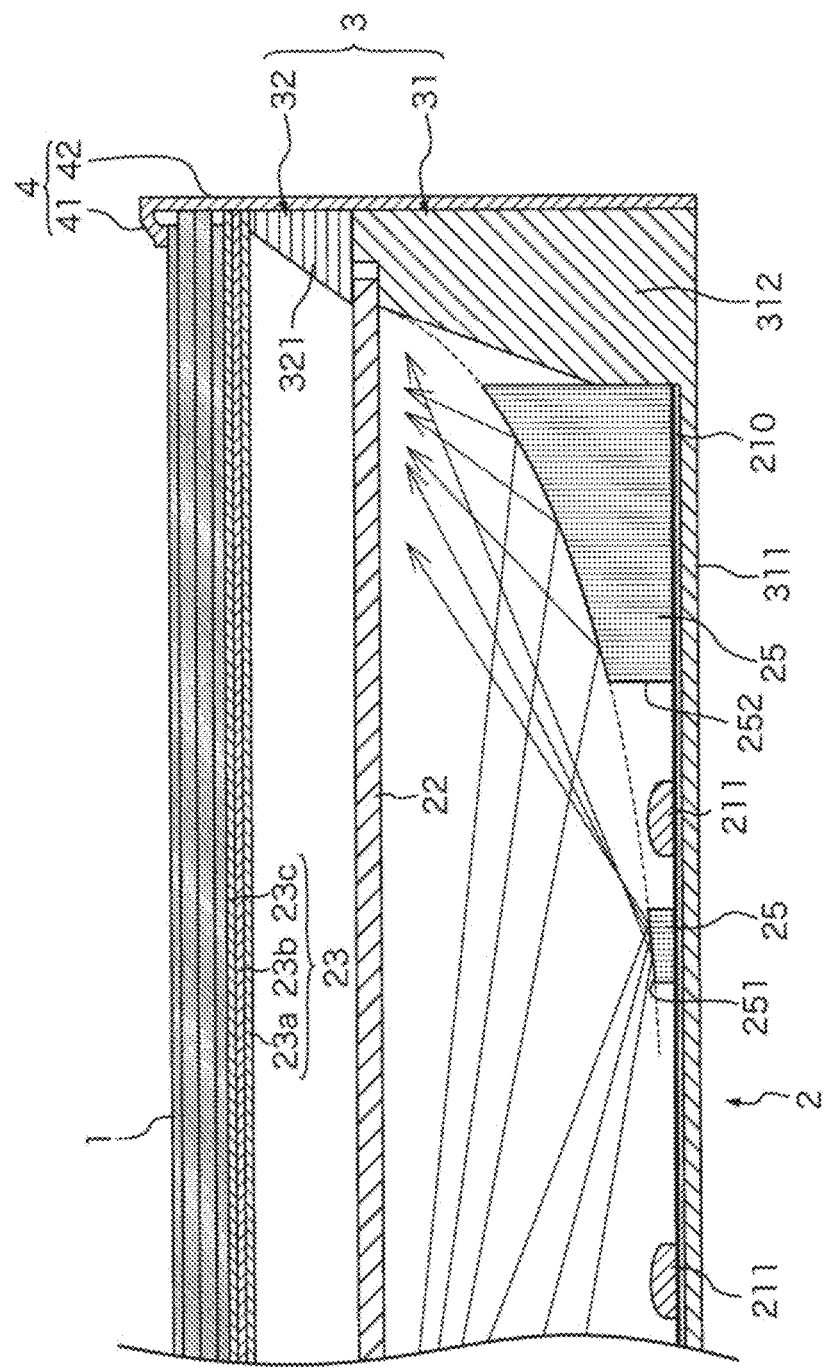
FIG. 8 is a cross-sectional view taken along the line VII-VII in FIG. 6.

The following describes a second embodiment in which reflection members 25 each surrounding a corresponding one of the LED chips 211 are provided. Note that an overall configuration of a display apparatus in the second embodiment is the same as that in the first embodiment. Therefore, description thereof is omitted, FIG. 6 is a partial front view of the display apparatus according to the second embodiment. FIGS. 7 and 8 are cross-sectional views taken along a line VII-VII in FIG. 6. Similarly to the first embodiment, the reflection members 25 are provided around the LED chips 211 located near the four corners of the liquid crystal panel 1 in the second embodiment. Each of the reflection members 25 according to the second embodiment is a fan-shaped member in a front view and includes a reflection surface 251 and an accommodation section 252 accommodating the corresponding LED chip 211. The reflection surface 251 is inclined such that height of the reflection surface 251 from the LED substrate 210 increases toward the corresponding corner of the substrate 210.

The accommodation section 252 is formed by cutting out a cylinder or an elliptic cylinder from the reflection member 25 such that the reflection member 25 does not block light emitted from the LED chip 211 accommodated in the accommodation section 252 (see FIG. 7).

The reflection surface 251 of each reflection member 25 reflects light emitted from the LED chips 211, 211, ..., 211 and diffused by the diffusion plate 22 or the optical sheet 23 toward a corresponding one of the four corners of the liquid crystal panel 1 that is closest to the reflection member 25. In this connection, the entirety of the reflection member 25 (or the reflection surface 251 of the reflection member 25) is preferably formed of a reflection body for example having a light reflectivity of at least 85%. Alternatively, a reflection sheet having high reflectivity may be provided on or near the reflection surface 251 or white paint may be applied onto the reflection surface 251.

According to the reflection member 25 of the present embodiment, light incident on the reflection surface 251 at a relatively small angle can be reflected toward a corresponding one of the four corners of the liquid crystal panel 1 and light incident on the reflection surface 251 at a relatively large angle can be reflected toward a region of the liquid crystal panel 1 that is adjacent to the corresponding corner and slightly, closer to the reflection member 25 than the corner is, as illustrated in FIG. 8. Note that according to degree of evenness of luminance or light quantity required at the four corners of the liquid crystal panel 1 for example, appropriate alterations can be made on for example: width of the reflection members 25; angle range within which the reflection surfaces 251 are provided; height of the reflection members 25 from the surface of the substrate 210; inclination angle of the reflection surfaces 251; and position at which the LED chips 211 are accommodated.

When light from the LED chips 211, 211, . . . , 211 passes through the diffusion plate 22, the diffusion plate 22 diffuses the light using the diffusion particles therein. Therefore, the diffusion plate 22 has the function of evening out luminance distribution of light passing toward the liquid crystal panel 1 over the surface thereof. Generally however, distance from light sources such as LEDs to a panel chassis is longer in an oblique direction than in a vertical direction or a horizontal direction. As a result, a light quantity tends to decrease in four corner regions of a panel and therefore the four corner regions tend to be noticeably dark relatively when compared to a region of the panel other than the four corner regions.

In view of the foregoing, the reflection members 25 are provided around the LED chips 211 located near the four corners of the liquid crystal panel 1 in the present embodiment. In the above configuration, not only light emitted from the LED chips 211 toward the four corners of the liquid crystal panel 1 but also light that is diffused by the diffusion plate 22 or the optical sheet 23 and that would otherwise reach the four corners formed by the side inner surfaces of the backside panel chassis 31 reaches the four corners of the liquid crystal panel 1.

Therefore, a tight quantity of light reaching the four corners of the liquid crystal panel 1 can be increased also in the second embodiment relatively when compared to a configuration without the reflection members 25. Thus, reduction in light quantity in the vicinities of the four corners of the liquid crystal panel 1 can be prevented and degree of evenness of luminance distribution over the surface of the liquid crystal panel 1 can be increased.

Figure 9:
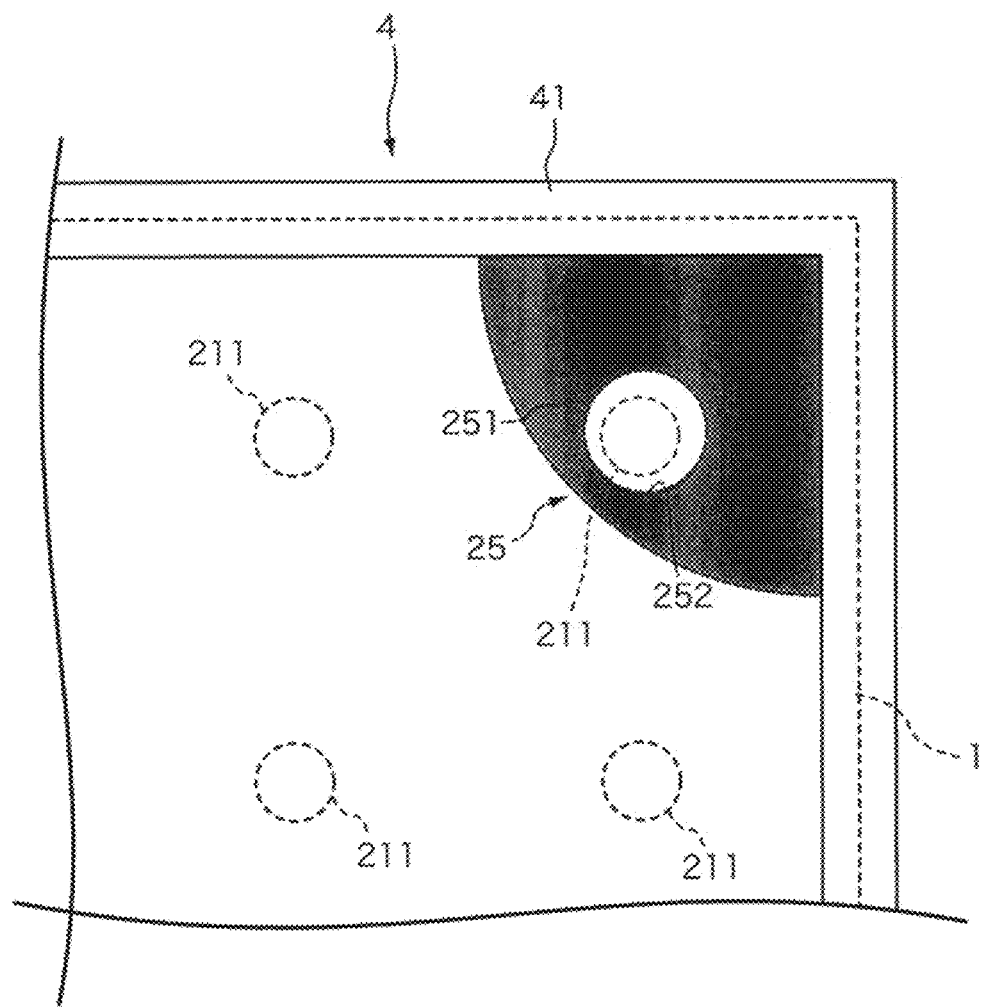
FIG. 9 is a front view illustrating a first variation of a reflection member.

Note that the shape of the reflection members 25 is not limited to that illustrated in FIG. 6. FIG. 9 is a front view illustrating a first variation of the reflection members 25. Similarly to the reflection members 25 described above, the reflection member 25 illustrated in FIG. 9 includes a reflection surface 251 and an accommodation section 252 accommodating the LED chip 211. The reflection surface 251 is inclined such that height of the reflection surface 251 from the LED substrate 210 increases toward the corresponding corner of the substrate 210. The reflection member 25 illustrated in FIG. 9 has the shape of a quarter circle (shape of a fan having a central angle of 90°) in a front view. The reflection surface 251 of the reflection member 25 illustrated in FIG. 9 has a larger area than the reflection surface 251 illustrated in FIG. 6. Therefore, a light quantity of light reaching the corresponding one of the four corners of the liquid crystal panel 1 can be increased.

Figure 10:
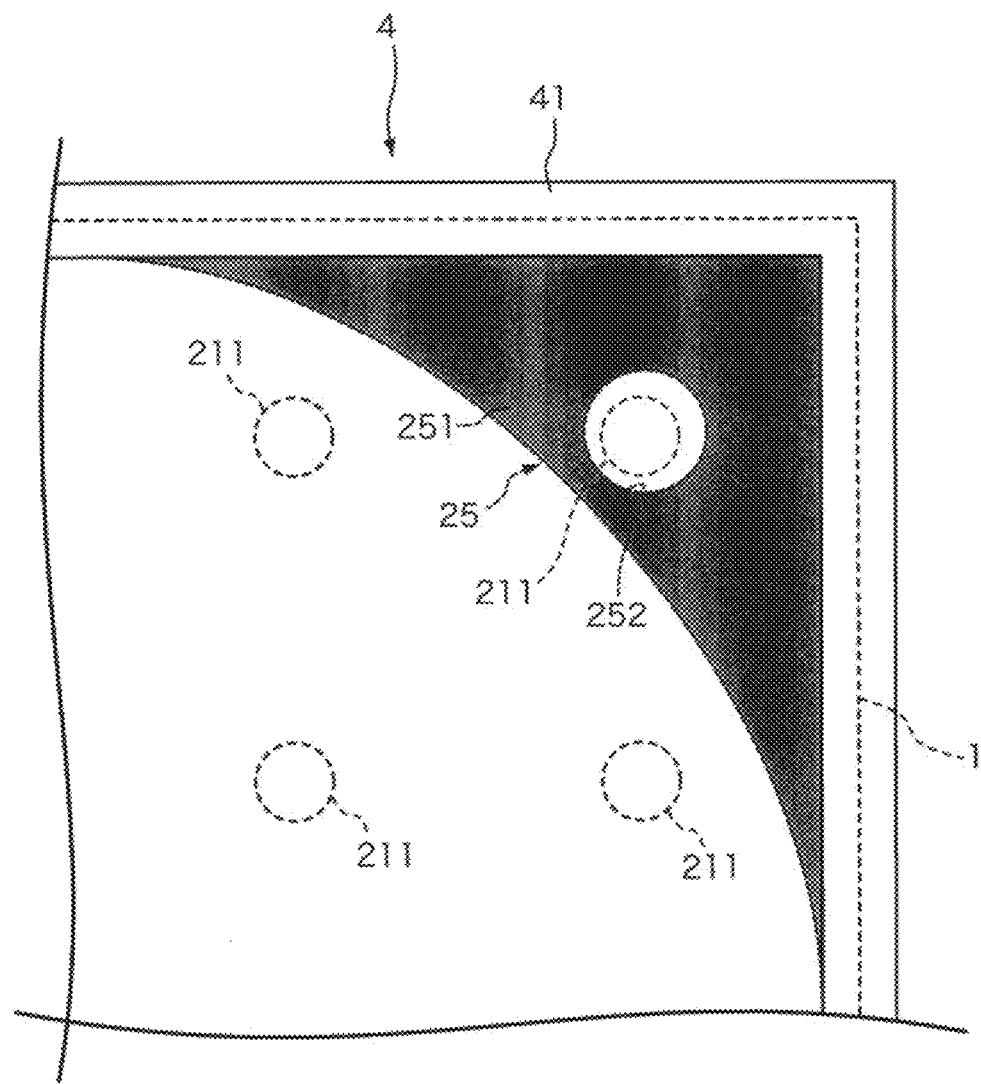
FIG. 10 is a front view illustrating a second variation of the reflection member.

FIG. 10 is a front view illustrating a second variation of the reflection members 25. Similarly to the reflection members 25 described above, the reflection ember 25 illustrated in FIG. 10 includes a reflection surface 251 and an accommodation section 252 accommodating the LED chip 211. The reflection surface 251 is inclined such that height of the reflection surface 251 from the LED substrate 210 increases toward the corresponding corner of the substrate 210. The reflection member 25 illustrated in FIG. 10 has a shape formed by cutting out a fan shape from a square in a front view. In the second variation, the reflection surface 251 has a larger area than the reflection surface 251 illustrated in FIG. 6 and light directed to the periphery of the substrate 210 in the vicinity of the corresponding one of the four corners of the substrate 210 can be reflected toward the corresponding one of the four corners of the liquid crystal panel 1. Therefore, a light quantity of light reaching the corresponding one of the four corners of the liquid crystal panel 1 can be increased.

Third Embodiment

The following describes a third embodiment in which reflection members that reflect light diffused by the diffusion plate 22 or the optical sheet 23 are provided integrally with the backside panel chassis 31.

Note that an overall configuration of a display apparatus in the third embodiment is the same as that in the first embodiment. Therefore, description thereof is omitted.

Figure 11:
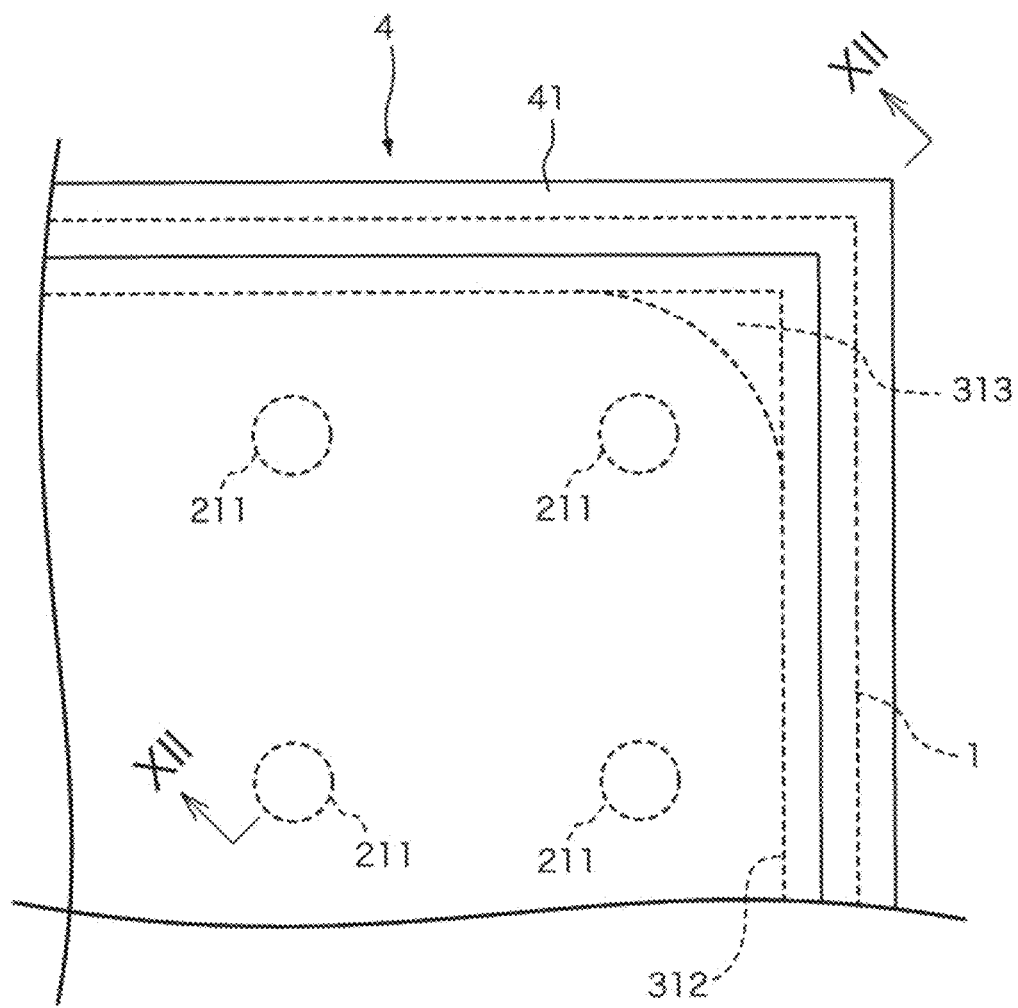
FIG. 11 is a partial front view of a display apparatus according to a third embodiment.
Figure 12:
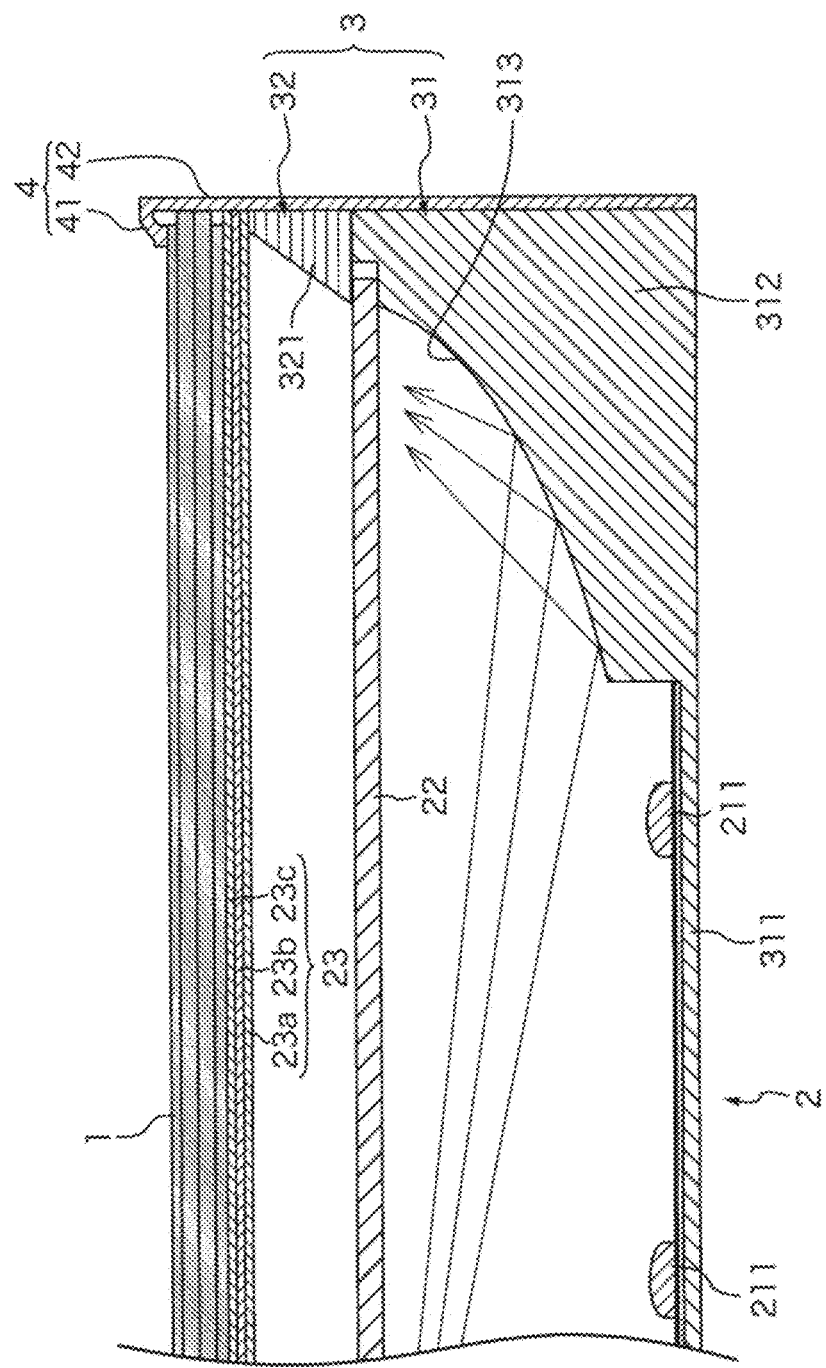
FIG. 12 is a cross-sectional view taken along a line XII-XII in FIG. 11.

FIG. 11 is a partial front view illustrating the display apparatus according to the third embodiment. FIG. 12 is a cross-sectional view taken along a line XII-XII in FIG. 11. In the third embodiment, reflection members 313 are provided at the four corners formed by the side inner surfaces of the backside panel chassis 31. The reflection members 313 are provided integrally with the backside panel chassis 31 and each have an inclined surface inclined such that height of the inclined surface from the LED substrate 210 increases toward the corresponding corner of the substrate 210. The inclination angle of the inclined surface is adjusted such that incident light is reflected toward a corresponding one of the four corners of the liquid crystal panel 1. The inclination angle of the inclined surface differs from the inclination angle of the inner surfaces of the side walls 312 in portions thereof other than portions forming the four corners.

Each of the reflection members 313 reflects light emitted from the LED chips 211, 211, . . . , 211 and diffused by the diffusion plate 22 or the optical sheet 23 toward a corresponding one of the four corners of the liquid crystal panel 1 that is closest to the reflection member 313. In this connection, the reflection member 313 is preferably formed of a reflection body for example having a light reflectivity of at least 85%. Alternatively, a reflection sheet having high reflectivity may be provided on or near a reflection surface of the reflection member 313 or white paint may be applied onto the reflection surface.

When light from the LED chips 211, 211, . . . , 211 passes through the diffusion plate 22, the diffusion plate 22 diffuses the light using the diffusion particles therein. Therefore, the diffusion plate 22 has the function of evening out luminance distribution of light passing toward the liquid crystal panel 1 over the surface thereof. Generally, however, distance from light sources such as LEDs to a panel chassis is longer in an oblique direction than in a vertical direction or a horizontal direction. As a result, a light quantity tends to decrease in four corner regions of a panel and therefore the four corner regions tend to be noticeably dark relatively when compared to a region of the panel other than the four corner regions.

In view of the foregoing, the reflection members 313 are provided at the four corners formed by the side inner surfaces of the backside panel chassis 31 in the present embodiment. In the above configuration, not only light emitted from the LED chips 211 toward the four corners of the liquid crystal panel 1 but also light that is diffused by the diffusion plate 22 or the optical sheet 23 and that would otherwise reach the four corners formed by the side inner surfaces of the backside panel chassis 31 reaches the four corners of the liquid crystal panel 1.

Therefore, a light quantity of light reaching the four corners of the liquid crystal panel 1 can be increased in the third embodiment relatively when compared to a configuration without the reflection members 313. Thus, reduction in light quantity in the vicinities of the four corners of the liquid crystal panel 1 can be prevented and degree of evenness of luminance distribution over the surface of the liquid crystal panel 1 can be increased.

Although the third embodiment has been described about a configuration in which the reflection members 313 are provided integrally with the backside panel chassis 31, the reflection members 313 may be provided independently of the backside panel chassis 31.

Note that the presently disclosed embodiments are merely examples in all aspects and should not be construed to be limiting. The scope of the present invention is indicated by the claims, rather than by the description given above, and includes all variations that are equivalent in meaning and scope to the claims. Any combinations of technical features described in the respective embodiments are possible.

REFERENCE SIGNS LIST 1 liquid crystal panel
2 light source section
3 panel chassis
4 bezel
21 LED substrate
22 diffusion plate
23 optical sheet
24, 25, 313 reflection member
31 backside panel chassis
32 frontside panel chassis
211 LED chip

The invention claimed is:

1. A display apparatus comprising:
   a rectangular display panel having one surface on which an image is displayed;
   a substrate on which a plurality of light sources are mounted, the substrate facing another surface of the display panel which is opposite to the one surface;
   a diffusion plate disposed between the display panel and the substrate;
   a support member having an opening through which light from the plurality of light sources passes and configured to support a peripheral portion of the diffusion plate; and
   a reflection member, wherein
   the plurality of light sources include a first light source located near a first corner that is one of four corners of the display panel,
   the reflection member is located at least in a region that is located in the vicinity of the first light source and that includes a position opposite to the first corner with respect to the first light source, and
   the reflection member reflects light diffused by the diffusion plate toward the first corner of the display panel without reflecting light emitted from the first light source toward the diffusion plate.

2. The display apparatus according to claim 1, wherein the reflection member is provided around the first light source located closest to the first corner of the display panel.

3. The display apparatus according to claim 1, wherein the reflection member has an inclined surface inclined such that height of the inclined surface from the substrate increases toward the first corner, and the inclined surface reflects the light diffused by the diffusion plate.

4. The display apparatus according to claim 1, wherein the reflection member includes an accommodation section accommodating the first light source.

5. The display apparatus according to claim 1, wherein the reflection member is provided integrally with the support member.

6. The display apparatus according to claim 1, wherein the reflection member has a light reflectivity of at least 85%.

7. The display apparatus according to claim 1, wherein the reflection member surrounds the first light source located near the first corner of the display panel.

8. The display apparatus according to claim 7, wherein a part of the reflection member located close to the first corner of the display panel with respect to the first light source has a height that is higher than a height of another part of the reflection member located opposite to the first corner of the display panel with respect to the first light source.

9. The display apparatus according to claim 1, wherein the first light source is closest to the reflection member among the plurality of light sources.

* * * * *